March 1, 1932.    N. T. BRANCHE ET AL    1,847,376
CONTROLLING MECHANISM FOR GAS BURNING APPARATUS
Filed March 9, 1931
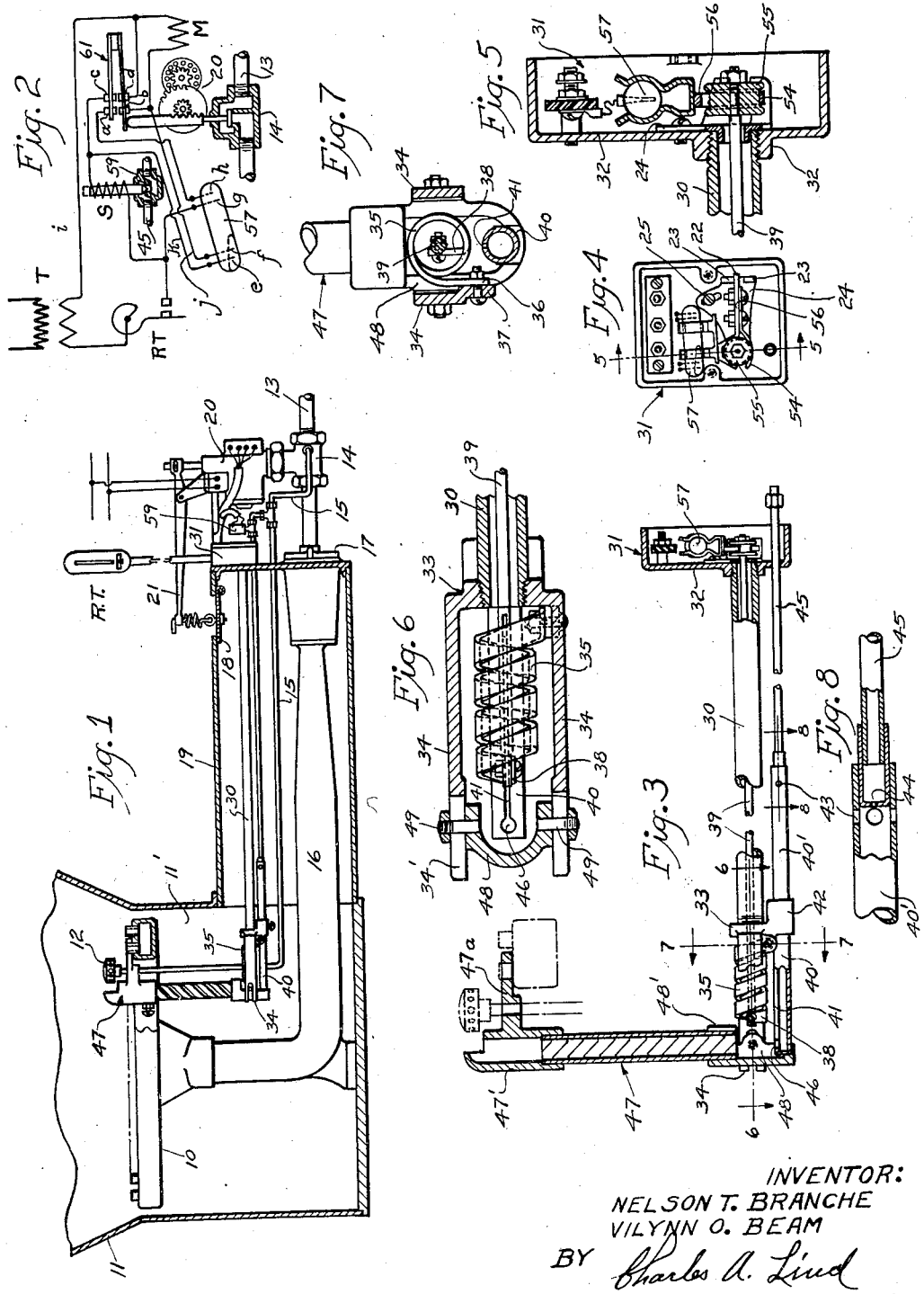
INVENTOR:
NELSON T. BRANCHE
VILYNN O. BEAM
BY Charles A. Lind
ATTORNEY.

Patented Mar. 1, 1932

1,847,376

UNITED STATES PATENT OFFICE

NELSON T. BRANCHE AND VILYNN O. BEAM, OF TOLEDO, OHIO, ASSIGNORS TO SURFACE COMBUSTION CORPORATION, OF TOLEDO, OHIO, A CORPORATION OF NEW YORK

CONTROLLING MECHANISM FOR GAS BURNING APPARATUS

Application filed March 9, 1931. Serial No. 521,119.

This invention relates to controlling mechanism for gas burning apparatus and more particularly to thermostatically controlled means for controlling the operation of gas burner apparatus having special utility in connection with house heating furnaces.

House-heating burner apparatus is ordinarily controlled by a room thermostat and there is usually provided a safety thermostat which unless the pilot is burning will not permit the burner motor to be operated. Since the pilot and hence also the safety thermostat are in relatively close proximity to the main burner, the thermostat is subject to heating not only by the pilot but also by the main burner. The result is that the safety thermostat is overheated and soon loses its efficiency and moreover cooling thereof is delayed following shut-off of the gas to the main burner.

One of the objects of the present invention is to provide a safety thermostat arrangement which will permit the thermostat to be located relatively remote from the pilot and main burner and to provide a special burner for heating the thermostat, the special burner being ignited by the pilot, the supply of gas to the special burner being controlled by the room thermostat.

Another object is to provide a controlling system which shall require the safety thermostat to cool, following shut-off of gas to the safety-thermostat burner upon the room thermostat moving to no-call-for-heat position, in order that should the room thermostat move to call-for-heat position before the safety thermostat has cooled to the required degree a resumption of fuel to said burner can not be effected and hence the apparatus, as a whole, will remain non-operative until the same sequence of steps shall have been gone through as when the room thermostat first moved to call-for-heat position.

The ways and means for realizing the above and other objects will more fully appear from the detailed description taken in connection with the accompanying drawings forming part of this specification and wherein the preferred form of the invention is shown.

Referring to the drawings:

Fig. 1 is illustrative of a type of burner apparatus with which the present invention finds special utility;

Fig. 2 is a diagrammatic representation of the controlling circuit for the burner apparatus;

Fig. 3 is a side elevation on an enlarged scale of a flame-heated thermostat mechanism, parts being broken away and in section;

Fig. 4 is an end elevation of the switch-mechanism end of the apparatus shown in Fig. 3;

Fig. 5 is an enlarged section on line 5—5 of Fig. 4;

Fig. 6 is an enlarged section on line 6—6 of Fig. 3;

Fig. 7 is an enlarged section on line 7—7 of Fig. 3, and

Fig. 8 is an enlarged fragmentary view on line 8—8 of Fig. 3.

In the drawings, 10 indicates a main gas burner; 11 a furnace such as a house heating furnace wherein said burner is adapted to be positioned; 12 a continuously burning pilot for the burner 10; 13 the main gas supply pipe; 14 the main gas valve; 15 the pipe which supplies gas to the pilot; 16 the air and gas mixing tube for the burner 10; 17 a damper for controlling the admission of primary air into said mixing tube; 18 a damper for controlling the admission of secondary air to the burner by way of a conduit or casing 19 discharging into the ash pit 11' of the furnace; 20 the motor for actuating the main gas valve 14; 21 a motor-actuated lever for actuating the secondary air damper, and RT a room thermostat. The above described apparatus forms, as it were, the environment where the present invention finds special utility.

Coming now to a description of the present invention, there is provided a support comprising a tubular member 30 and a box 31 from a side wall 32 of which the tube 30 projects, the box being adapted for removable securement to the front end of the secondary air conduit 19. Supported by the free end of said member 30 is a yoke 33, the side arms of which are indicated at 34. Positioned between the arms 34 is a thermostat or thermal element 35 in spiral form, one end 36 of the element being secured to a depending lug 37 on one of the side arms 34. Secured to the other end 38 of said element is a rod 39 which extends back through the spiral and tubular support 30 and into the box 31. When the thermostat is heated, it will turn the rod 39 about its axis.

The thermostat 35 is heated by a burner therebelow, said burner comprising a tube 40 provided in its upper side with a longitudinally extending slot 41 for the issuance of the gas to be burned, the tube being supported in a boss or lug 42 depending from the yoke 33. The tube 40 is conveniently extended beyond its supporting boss whereby to constitute a mixing tube 40' for air and gas admitted thereto by radial ports 43 and gas jet orifice 44 respectively; gas being supplied to said orifice by a gas pipe 45 which extends as a branch from the pipe 15 which delivers to the continuously burning pilot 12. It will be noted that the burner 40 projects beyond the thermal element 35 and is provided at its outer end with a discharge orifice or port 46, the purpose of which will presently appear.

Extending upwardly from the free end of the yoke 33 is a flame-conducting tube generally indicated at 47, it being noted that this tube terminates adjacent the continuously burning pilot 12 and is of relatively large internal diameter. The lower end of said tube 47 is disposed over the terminal port 46 in the burner 40 to the end that gas discharged from said port may flow into said tube for passage to the pilot 12 whereby to be ignited thereby with resultant propagation of the flame to the gas burner 40 below the thermostat 35. The gas discharged from the burner port 46 having previously been mixed with air, as already described, requires but little additional air to form a so-called "explosive" mixture. Consequently, when the gas emerges from said port 46 and passes into the tube 47, the lower end of which is open to the atmosphere, the mixture becomes explosive and upon being ignited by the pilot 12 the flame immediately back flashes and ignites the gas issuing from the thermostat burner 40.

At the upper end of the tube 47 is a head 47' having a laterally extending lug 47ª adapted to rest on the gas burner 10 and adapted to serve as a support for the pilot 12. At the lower end of the tube is a casting 48 having an apertured boss 48' whereinto the tube proper projects, the tube proper being preferably a flexible tube. Below the boss 48' the casting is semi-circular as clearly indicated in Fig. 6, and projecting laterally from the sides thereof are diametral pins 49 which extend through the side arms 34 of the yoke 33, the outer end of said arms being bifurcated as indicated at 34'. The primary purpose of attaching the tube 47 to the yoke 33 as indicated is to permit ready assemblage and disassembly of the parts. By making the tube proper of flexible material such as a flexible metallic hose, it may be more readily fitted into position between the burner 10 and the yoke arms 34 as will be readily understood.

Affixed to that end of the thermostat rod 39 which projects into the box 31 is a friction disk 55. Frictionally coupled to said disk is a carrier block 56 whereon is removably supported a mercury switch 57 comprising a glass tube containing mercury, the tube being supported in spring clamps secured to the carrier block. The degree of turning movement of the block is limited by a finger 22 which extends between two spaced lugs 23 which project laterally from a plate 24 adjustably mounted on the wall 32 of the box 31 as by a screw and slot connection 25. By adjusting the plate 24 the position of the mercury in the switch may be readily controlled as will be readily appreciated.

The block 56 is shown as coupled to the disk 55 by a saddle and a spring finger 54 for maintaining the required frictional resistance between the saddle and disk. Since the limits of movement of the switch carrier block are fixed by the lugs 23 the frictional connection obviously permits relative angular movement between the block and disk after the limits of movement of the block are reached.

Flow of gas to the thermostat burner 40 is automatically cut-off by a valve 59 when the room thermostat is open, or in other words when there is no call for heat by the room thermostat; the valve being adapted for actuation by a solenoid S. The main-gas-valve motor 20 is preferably of a type embodying a rack and pinion, the gas valve 14 remaining open as long as the motor is energized but will automatically close as soon as the motor is deenergized.

Referring now to the circuit shown in Fig. 2: Included in said circuit is a mechanical switch 61 adapted to be actuated by suitable moving parts of the motor 20, this switch embodying contacts $a$, $b$, $c$ and $d$, constituting gaps $a$—$b$, and $c$—$d$. The mercury switch 57 embodies contacts $e$, $f$, $g$ and $h$, constituting three gaps $e$—$f$; $f$—$g$; and $g$—$h$. M is the motor field and T the power line transformer. When there is no call for heat by the room thermostat the parts are in the position shown in Fig. 2. On a call for heat the gap in the room thermostat RT closes and thereupon the circuit from the secondary of the transformer is as follows:

Wire $i$; motor field M; wire $j$; gap $f$—$e$ through the mercury; wire $k$; coil S and thermostat RT. Notwithstanding said circuit is through the motor M, the motor is not energized for the reason that the coil S is of sufficiently high resistance to act as a choke. The solenoid S being energized, the valve 59 opens and gas flows to the thermostat burner 40; and the thermostat becoming hot, the rod 39 and hence the mercury switch 57 begins to turn. Eventually the gap $f$—$g$ will be closed by the mercury whereupon the motor circuit no longer includes the solenoid coil S and hence the motor M is energized with resultant opening of the main gas valve 14 and closing of the switch 61.

As soon as switch 61 is closed, the gaps $a$—$b$ and $c$—$d$ are closed. The circuit for the solenoid S thereupon includes gap $c$—$d$. Eventually the mercury will leave the gap $e$—$f$ and then gap $f$—$g$ and close the gap $g$—$h$. The opening of gap $e$—$f$ has no effect on solenoid S because of the new circuit established by the closing of gap $c$—$d$. The opening of gap $f$—$g$ has no effect on the motor circuit because of the new circuit previously established by closing of gap $a$—$b$, it being understood that gap $g$—$h$ is closed before the gap $f$—$g$ is opened. When the room thermostat RT moves to no-call-for-heat position the solenoid S is deenergized with resulting shutting off of the thermostat burner 40 whereupon due to cooling of the thermostat 35 the mercury switch returns to its original position as shown in Fig. 2.

From the foregoing it will be seen that the main gas valve 14 can not be opened until the thermostat 35 permits and the latter will not permit unless the pilot 12 is burning or in other words until the burner 40 is ignited by the pilot 12. Moreover the electrical circuit is such that following even a momentary opening of the room thermostat, the main gas valve 14 cannot be opened until the thermostat 35 has cooled and been reheated. Consequently there will always be an appreciable time interval before the main gas burner 10 can be lighted following opening and closing of the room thermostat.

What we claim is:

1. The combination with a pilot, of a gas discharge orifice remote from said pilot, a flame conducting tube whereinto gas from said orifice discharges in a manner to entrain sufficient air to form an explosive mixture, said tube having its discharge end adjacent said pilot whereby the mixture upon issuing from said tube will be ignited and flash back to said orifice, a gas burner in sufficiently close proximity to said orifice to be ignited by the flash back of flame to said orifice, and a thermostat adapted to be heated by the flame from said burner.

2. In combination, a support having a pair of arms extending therefrom in a common direction, a spiral thermostat mounted between said arms and having one of its ends secured to said support, a rod extending through the axis of said spiral and secured to the free end thereof, a gas burner carried by said support and adapted to heat said thermostat, said burner having a discharge orifice through which some of the gas supplied thereto may flow, and a flame-conducting tube mounted on said support and disposed over said orifice, said tube being of such form that upon the ignition of the gas emerging therefrom the flame will flash back to said orifice and ignite said burner.

3. In a burner control system, the combination with a main burner-valve motor and a room thermostat, of a three-gap mercury switch, a thermostat for actuating said switch, a burner for heating the switch-actuating thermostat, a motor for controlling the admission of gas to said thermostat burner, said thermostat-burner motor being in series with the room thermostat and burner-valve motor through one of the gaps of said mercury switch when the mercury-switch-actuating thermostat is cold whereby said thermostat-burner motor will be actuated but the circuit having sufficient resistance to prevent the burner-valve motor from being actuated, a two-gap switch, means controlled by the main burner-valve motor for closing the two-gap switch when the second gap of the mercury switch closes, the third of said mercury-switch gaps establishing a holding circuit for the burner-valve motor following continued heating of the mercury-switch-actuating thermostat, said holding circuit being through one of the gaps of the two-gap switch, the second of said gaps of the two-gap switch establishing a holding circuit for the thermostat-burner motor independently of the mercury switch as long as the room thermostat remains closed.

4. In combination, a main burner, a normally burning pilot therefor, a thermostat relatively remote from the pilot for controlling the admission of fuel to said burner, a small capacity burner for heating the thermostat, and means for igniting the thermostat burner comprising a tube extending from said pilot to said burner and means for discharging a jet of gas into said tube in such a manner that the gas issuing from said tube will be ignited by the pilot and flash back and ignite the thermostat burner.

5. In combination, a main burner, a normally burning pilot therefor, a thermostat relatively remote from the pilot for controlling the admission of fuel to the burner, a small capacity burner for heating the thermostat, means permitting said pilot to ignite the thermostat burner when gas is admitted to the latter, and a remote control thermostat for controlling the admission of gas to the thermostat burner.

6. In combination, a main burner, a normally burning pilot therefor, a laterally extending conduit for admitting secondary air to the burner, a thermostat for controlling the admission of fuel to said burner, a support extending longitudinally within said conduit for supporting said thermostat, a tube supported by the burner adjacent said pilot and coupled to said support adjacent the thermostat, a small capacity burner carried by said support for heating the thermostat and adapted to discharge a jet of gas into said tube in such a manner that upon being ignited by the pilot the flame will flash back and ignite the thermostat burner.

7. In combination, a main burner, a laterally extending conduit for admitting secondary air to the burner, a switch box secured to the outer end of said conduit, a tube supported by said box and extending into said conduit, a switch actuating rod housed by said tube, a thermostat connected to said rod and supported at the free end of the tube, a thermostat heating burner secured to said tube, a flame conducting tube depending from the main burner adjacent said pilot and having its lower end removably coupled to said support, and means associated with the thermostat burner for discharging a jet of gas into said tube in such a manner that upon being ignited by said pilot the flame will flash back and ignite the thermostat burner.

In testimony whereof we affix our signatures.

NELSON T. BRANCHE.
VILYNN O. BEAM.